(12) United States Patent
Finley (10) Patent No.: US 6,342,172 B1
(45) Date of Patent: Jan. 29, 2002

(54) METHOD OF FORMING A FOAMED THERMOPLASTIC POLYMER AND WOOD FIBER PROFILE AND MEMBER

(75) Inventor: Mark D. Finley, Stillwater, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 09/528,668

(22) Filed: Mar. 20, 2000

Related U.S. Application Data (62) Division of application No. 09/010,410, filed on Jan. 21, 1998, now Pat. No. 6,054,207.

(51) Int. Cl.[7] ............................................. B29C 44/20
(52) U.S. Cl. ....................... 264/45.3; 264/45.6; 264/48; 264/54
(58) Field of Search ....................... 264/45.3, 54, 45.6, 264/48

(56) References Cited

U.S. PATENT DOCUMENTS

| | | |
|---|---|---|
| 3,764,642 A | 10/1973 | Boutillier |
| 3,879,505 A | 4/1975 | Boutillier et al. |

(List continued on next page.)

FOREIGN PATENT DOCUMENTS

| | | |
|---|---|---|
| GB | 2 036 148 A | 6/1980 |
| JP | 58179242 A | 10/1983 |
| JP | 60082319 A | 5/1985 |
| JP | 60163939 A | 8/1985 |
| JP | 63139946 A | 6/1988 |
| JP | 2032805 A | 2/1990 |

OTHER PUBLICATIONS

"A More Efficient Processing Aid for Foamed Vinyl", John R. Patterson et al., reprint from *Resin Review*, vol. XLV, No. 1 (undated).

(List continued on next page.)

*Primary Examiner*—Allan R. Kuhns
(74) *Attorney, Agent, or Firm*—Merchant & Gould P.C.

(57) ABSTRACT

Advanced structural components comprising a foamed thermoplastic that can be used in virtually any application where wooden components have a use. Such structural components can comprise sized lumber, shaped trim, posts, beams or shaped structural members. An advanced profile composite structural component comprising an exterior capping layer with an interior comprising a foamed thermoplastic can be used in the assembly of fenestration units adapted to residential and commercial structures. Preferably the profile structural component can be used in a window or door assembly. The profile member is adapted for ease of construction of the fenestration units, can be easily installed in a rough opening to framing members, and can be trimmed and adjusted on site. The profile is structurally strong, thermally stable, shrink resistant and will accept and retain the insertion of fasteners such as staples, nails and screws permanently with substantial retention and little or no damage to the units. The profile structural components possess strength that permits the manufacture of a structurally sound fenestration unit from two or more foamed profile members or other conventional members.

17 Claims, 1 Drawing Sheet

U.S. PATENT DOCUMENTS

| | | | |
|---|---|---|---|
| 3,903,023 | A | 9/1975 | Boutillier et al. |
| 3,937,777 | A | 2/1976 | Wienand et al. |
| 3,978,632 | A | 9/1976 | Ansted |
| 4,028,449 | A | 6/1977 | Kakitani et al. |
| 4,031,045 | A | 6/1977 | Goswami |
| 4,187,352 | A | 2/1980 | Klobbie |
| 4,234,641 | A | 11/1980 | Thompson et al. |
| 4,473,665 | A | 9/1984 | Martini-Vvedensky et al. |
| 4,510,201 | A | 4/1985 | Takeuchi et al. |
| 4,948,655 | A | 8/1990 | Danese |
| 4,956,234 | A | 9/1990 | Morales |
| 5,102,922 | A | 4/1992 | Kimura et al. |
| 5,245,141 | A | 9/1993 | Fortez et al. |
| 5,300,533 | A | 4/1994 | Dahl et al. |
| 5,318,737 | A | 6/1994 | Trabert et al. |
| 5,334,622 | A | 8/1994 | Bergvist |
| 5,363,611 | A | 11/1994 | Richardson et al. |
| 5,406,768 | A | 4/1995 | Giuseppe et al. |
| 5,474,722 | A | 12/1995 | Woodhams |
| 5,508,103 | A * | 4/1996 | Cope .................... 156/244.12 |
| 5,539,027 | A | 7/1996 | Deaner et al. |
| 5,847,016 | A | 12/1998 | Cope |
| 5,951,927 | A * | 9/1999 | Cope .......................... 264/54 |
| 6,153,293 | A * | 11/2000 | Dahl et al. ................. 264/45.3 |

OTHER PUBLICATIONS

"Celogen Foaming Agents, CELOGEN® AZRV" Product Information from Uniroyal Chemical (undated).

"Characterization of Microcellular Foamed PVC/Cellulosic–Fibre Composites", L. Matuana–Malanda et al., *Journal of Cellular Plastics*, vol. 32—Sep. 1996, pp. 449–469.

"Effect of Cell Morphology on the Properties of Microcellular Foamed PVC/Wood=Fiber Composites", Laurent M. Matuana et al., *Cellular and Microcellular Materials*, MD–vol. 76, ASME 1996, pp. 1–16.

"Measuring Performance Improvements with SAFOAM® in Foam Extrusion Applications", Reedy International Corporation (undated).

"Paraloid® Additives for PVC From Rohm and Haas", Product Update, ©1995 Rohm and Haas Company.

Processing and Cell Morphology Relationships for Microcellular Foamed PVC/Wood–Fiber Composites, Laurent M. Matuana et al., *Polymer Engineering and Science*, Jul. 1997, vol. 37, No. 7, p. 11371147.

"Production of Microcellular Foamed PVC/Wood–Fibre Composites Processing and Cell Morphology Relationship", Laurent Matuana–Malanda et al., *ANTEC* '96, pp. 1900–1907.

"Rigid Vinyl Foam Applications", Rohm and Haas (undated).

"SAFOAM® AP–40 Chemical Nucleating and Blowing Agent", Reedy International Corporation, Specification Sheet (undated).

"Suppliers team to expand foam coex into sheet, profiles", from Technology News, Plastics World, Oct. 1996.

* cited by examiner

METHOD OF FORMING A FOAMED THERMOPLASTIC POLYMER AND WOOD FIBER PROFILE AND MEMBER

This application is a division of Ser. No. 09/010,410, filed Jan. 21, 1998, now U.S. Pat. No. 6,054,207.

FIELD OF THE INVENTION

The invention relates to materials used in the fabrication of structural members or trim elements used in construction materials and fenestration units installed in residential and commercial architecture. More particularly, the invention relates to an improved profile or structural member that can be used as a direct replacement for wood and metal components having superior properties for fenestration, structural or construction purposes. The structural members of the invention can comprise sized lumber replacements and structural components with complex functional shapes such as wood and door rails, jambs, stiles, sills, tracks, stop and sash and miscellaneous trim elements. Further, the invention relates to structural components used in the fabrication of fenestration units such as windows and doors for commercial and residential architecture.

The structural components are made from an extruded composite polymer foam material. The structural components of the invention can form high strength joints in the construction assembly. The materials can be easily installed, adjusted, shimmed and trimmed with conventional fasteners and techniques. The components have thermal and mechanical properties rendering them durable yet easy to manufacture and install.

BACKGROUND OF THE INVENTION

Conventional industrial, commercial and residential architecture commonly involve the use of structural and nonstructural components in the assembly of useful units. Such components are often made from concrete, stone, wood, glass or metal. These materials are well known and are well understood in their applicability to construction purposes.

Wood has been milled into shaped structural components such as sized lumber, trim. post and beam and have also been used to form structural components that can be assembled with glass to form door and window units. Wood, lumber, trim. post, beam and assembled units comprising wood have obvious utility and are well adapted for many uses in many residential or commercial installations. However, the wood used in these applications, under certain circumstances, can have problems. Wood can deteriorate due to the effect of fungus and insect attack. Further, wood members also suffer from cost problems related to the availability of suitable for wood for construction purposes and require substantial upkeep comprising painting or staining. Metal, typically aluminum or steel, components are also often used in industrial, commercial and residential construction. Metal components can suffer from rust or corrosion problems and require their own particular construction skills and maintenance regimen. Vinyl polymeric materials have also been used in formation of structural members and for forming profiles in window and door assembly. Such vinyl materials typically comprise a major proportion of a vinyl polymer with a variety of additive materials that are used. Filled and unfilled (filled with additive materials such as fiber, inorganics, dye etc.) rigid and flexible thermoplastic materials have been extruded or injection molded into a variety of both structural and sealing materials. A thermoplastic polyvinyl chloride has been combined with wood members in the manufacture of PERMASHIELD® brand windows manufactured by Andersen Corporation for many years. This vinyl cladding technology is disclosed in Zaninini, U.S. Pat. Nos. 2,926,729 and 3,432,885. The technology disclosed in these patents involves the extrusion or injection molding of a thin polyvinyl chloride coating or envelope loosely formed around a shaped wooden structural member.

The polyvinyl chloride thermoplastic materials have also been combined with wood products to make extrusion materials. Initial efforts resulted in a material that can be directly extruded to form a member that has a modulus typically about 500,000 or less. Such members also failed to have adequate compressive strength, coefficient of thermal expansion, coefficient of elasticity, fastener retention or other useful properties required for use in many construction applications.

More recently, U.S. Pat. Nos. 5,486,553, 5,539,027, 5,406,768, 5,497,594, 5,441,801 and 5,518,677 assigned to Andersen Corporation, disclose the use of a thermoplastic such as polyvinyl chloride and wood fiber for the purpose of manufacturing a high strength composite material in the FIBREX® brand materials technology. Such composites are useful in the manufacture of a structural member such as a hollow profile that can be used in window and door manufacture. These materials have a high modulus (800,000 psi or more) and can be easily manufactured, assembled and installed. These unique high strength materials have had substantial success with respect to their use in window and door manufacture.

The PERMASHIELD® brand technology and the FIBREX® brand materials technology have substantial utility and have had substantial success in a variety of applications. Further extensions of thermoplastic polymer technology are useful for other applications. A need exists to obtain materials having enhanced properties.

BRIEF DISCUSSION OF THE INVENTION

We have found that a superior structural foamed material can be used to form a member which can be used as a replacement for stone, wood, glass and metal members. The member comprise a thermoplastic foam comprising a foamed composite comprising a thermoplastic polymer and a wood fiber. The wood fiber can be derived from either soft woods or evergreens or from hard woods commonly known as broad leaf deciduous trees. Soft woods are generally preferred for fiber manufacture because the resulting fibers are longer, contain high percentages of lignin and lower percentages of hemicellulose than hard woods. Additional fiber make-up can be derived from a number of secondary or fiber reclaim sources including bamboo, rice, sugar cane, and recycled fibers from newspapers, boxes, computer printouts, etc. One preferred source of wood fiber of this invention comprises the wood fiber product or by-product of sawing or milling soft woods. A quality fiber can be made by milling and a by-product of milling commonly known as sawdust or milling tailings can be used.

A large variety of thermoplastic polymer or resins can be used in the foamed composite materials of the invention. For the purpose of this application, a useful resin is a general term covering a thermoplastic that may or may not contain an additional filler or reinforcing material, other than wood fiber, that have mechanical, chemical and thermal properties suitable for use as structural components, machine components and chemical processing equipment components. We have found that the resins useful in the invention include both condensation polymeric materials and vinyl polymeric materials. The foamed material can provide improved thermal and physical properties. A large variety of vinyl polymeric materials can be used in the composite materials can be used in the composite materials of the invention. Useful vinyl polymers are polymers made by homopolymerization, copolymerization or terpolymerization methods. Condensation polymer resins can also be used in the composite materials of the invention.

The properties enhanced in the foamed composite include resistance to shrinkage, and improved COTE(Coefficient Of Thermal Expansion), compressive strength and fastener retention. Such a material display properties rendering the structural member ideal for industrial, commercial and household construction applications. The materials have acceptable thermal properties including a minimal coefficient of thermal expansion, minimal shrink and minimal heat distortion. Further, the materials can be easily manufactured, assembled into a useful structure and can be easily installed. For the purpose of this patent application the term "extrusion mass" indicates material processed by an extruder resulting in the foamed thermal plastic wood fiber composite. The extrusion mass can comprise a blend of powder, flaked or pelletized thermoplastic discrete wood fibers and a separate blowing agent each component mixed together to form a final extrusion mass. Alternatively, the extrusion mass can comprise a preformed pellet comprising thermoplastic, wood fiber and blowing agent preformed and a preextruded in a pellet composition. Alternatively, the extrusion mass can comprise a thermoplastic wood fiber pellet dry blended with a blowing agent. Alternatively, the extrusion mass can comprise the thermoplastic with the blowing agent dissolved or dispersed in the thermoplastic in the form of a pellet which is then blended with a separate wood fiber phase. In other words, the extrusion mass can comprise the thermoplastic, the wood fiber or the blowing agent in any useful form of an extrudable mass.

DETAILED DESCRIPTION OF THE INVENTION

Wood Fiber

The primary source for wood fiber of this invention comprises the wood fiber product or by-product of comminuting, sawing or milling wood materials, preferably soft woods. A quality fiber can be made by milling and a by-product of milling commonly known as sawdust or milling tailings can be used. Such wood fiber has a regular reproducible shape and aspect ratio. The fibers based on a random selection of about 100 fibers are commonly at least 0.05, preferably 0.1 mm in length, about 0.02 to 1 mm in thickness and commonly have an aspect ratio of at least 1.5. Preferably, the fibers are 0.1 to 5 mm in length with an aspect ratio between 2 and 7, preferably 2.5 to 6. The preferred fiber for use in this invention are fibers derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively removes wood from the piece leaving the useful shape. Such milling operations produces substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources of the invention can be blended regardless of particle size and used to make the composite. The fiber stream can be pre-sized to a preferred range or can be sized after blending. Further, the fiber can be pre-pelletized before use in composite manufacture.

Such sawdust material can contain substantial proportions of compatible waste stream by-products. Such by-products include waste polyvinyl chloride or other thermoplastic or polymeric materials that have been used as coating, cladding or envelope on wooden members; recycled structural members made from thermoplastic materials or composites; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc., and other waste streams common in the manufacture of wooden doors and windows. The total waste stream content of the wood fiber materials is commonly less than 25 weight percent (wt %) of the total wood fiber input into the composite product. Of the total waste recycle, approximately 10 wt % of that can comprise a thermoplastic. Commonly, the intentional recycle ranges from about 1 to about 25 wt %, preferably about 2 to about 20 wt %, most commonly from about 3 to about 15 wt % of contaminants based on the sawdust.

Moisture control is an important element of manufacturing a useful formed composite linear extrudate or pellet. Moisture can interfere with or change the constancy of the composite and the foamed product. Depending on the equipment used and processing conditions, control of the water content of the material can be important in forming a successful structural member substantially free of substantial changes in density, internal voids or surface blemishes.

The concentration of water present in the sawdust during the formation of pellet or foaming of the linear extrudate when heated can flash from the surface of the newly extruded structural member and can come as a result of a rapid volatilization, form a steam bubble deep in the interior of the extruded member which can pass from the interior through the hot thermoplastic extrudate leaving a substantial flaw. In a similar fashion, surface water can bubble and leave cracks, bubbles or other surface flaws in the extruded member. Further, engineering resins that are moisture sensitive should be avoided. Water can react with some condensation polymers resulting in increased melt index (MI) (MI as measured by ASTM 1238) and reduced molecular weight ($M_n$ or $M_w$).

Trees when cut depending on relative humidity and season can contain from 30 to 300 wt % water based on fiber content. After rough cutting and finishing into sized lumber, seasoned wood can have a water content of from 20 to 30 wt % based on fiber content. Kiln dried sized lumber cut to length can have a water content typically in the range of 8 to 12%, commonly 8 to 10 wt % based on fiber. Some wood source, such as poplar or aspen, can have increased moisture content while some hard woods can have reduced water content.

Because of the variation in water content of wood fiber source and the sensitivity of extrudate to water content control of water to a level of less than 8 wt % in the pellet based on pellet weight is important. For structural members extruded in non-vented extrusion process, the pellet should be as dry as possible and have a water content between 0.01 and 5%, preferably less than 1.5 wt %. When using vented equipment in manufacturing the extruded linear member, a water content of less than 8 wt % can be tolerated if processing conditions are such that vented extrusion equipment can dry the thermoplastic material prior to the final formation of the structural member at the extrusion head.

Thermoplastic Polymers, Hompolymers Copolymers and Polymeric Alloys

A large variety of thermoplastic polymer or resins can be used in the foamed composite materials of the invention. For the purpose of this application, a useful resin is a general term covering a thermoplastic that may or may not contain a filler or reinforcing material that have mechanical, chemical and thermal properties suitable for use as structural components, machine components and chemical processing equipment components. We have found that the resins useful in the invention include both condensation polymeric materials and vinyl polymeric materials. Included are both vinyl and condensation polymer resins, and alloys thereof, such as acrylonitrile-butadiene-styrene (ABS), polyacetyl resins, polyacrylic resins, fluorocarbon resins, nylon, phenoxy resins, polybutylene resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials. Vinyl polymers are typically manufactured by the polymerization of monomers having an ethylenically unsaturated olefinic group. Condensation polymer resins are typically prepared by a condensation polymerization reaction which is typically considered to be a stepwise chemical reaction in which two or more molecules combined, often but not necessarily accompanied by the separation of water or some other simple typically volatile substance. If a polymer is formed, the process is called polycondensation.

Vinyl Polymers

A large variety of vinyl polymeric materials can be used in the composite materials can be used in the composite materials of the invention. Useful vinyl polymers are polymers made by homopolymerization, copolymerization or terpolymerization methods. Homopolymers include polyolefins such as polyethylene, polypropylene, poly-1-butene, etc., polyvinylchloride, polymethacrylate, polymethylmethacrylate. Also useful are copolymers of alphaolefins with second monomers such as ethylene-propylene copolymers, ethylene-hexylene copolymers, ethylene-methacrylate copolymers, ethylene-methacrylate copolymers, etc. While homopolymers of styrene are not preferred, copolymeric materials made by polymerizing styrene with the second vinyl monomer are useful.

However, a preferred class of thermoplastic include styrenic copolymers. The term styrenic copolymer indicates that styrene is copolymerized with a second vinyl monomer resulting in a vinyl polymer. Such materials contain at least 5 mole percent styrene and the balance being one or more other vinyl monomers. An important class of these materials are styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

ASA resins are random amorphous terpolymers produced either by mass copolymerization or by graft copolymerization. In mass copolymerization, an acrylic monomer styrene and acrylonitrile are combined to form a heteric terpolymer. In an alternative preparation technique, styrene acrylonitrile oligomers and monomers can be grafted to an acrylic elastomer backbone. Such materials are characterized as outdoor weatherable and UV resistant products that provide excellent accommodation of color stability property retention and property stability with exterior exposure. These materials can also be blended or alloyed with a variety of other polymers including polyvinyl chloride, polycarbonate, polymethyl methacrylate and others. An important class of styrene copolymers includes the acrylonitrile-butadiene-styrene monomers. These resins are very versatile family of engineering thermoplastics produced by copolymerizing the three monomers. Each monomer provides an important property to the final terpolymer material. The final material has excellent heat resistance, chemical resistance and surface hardness combined with processability, rigidity and strength. The polymers are also tough and impact resistant.

The styrene copolymer family of resins have a melt index that ranges from about 0.5 to 25, preferably about 0.5 to 20. An important class of engineering resins that can be used in the composites of the invention include acrylic resins. Acrylics comprise a broad array of polymers and copolymers in which the major monomeric constituents are an ester acrylate or methacrylate. These resins are often provided in the form of hard, clear sheet or pellets. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for resin grade applications are typically made either in bulk (continuous solution polymerization), followed by extrusion and pelleting or continuously by polyermization in an extruder in which unconverted monomer is removed under reduced pressure and recovered for recycling. Acrylic plastics are commonly made by using methyl acrylate, methylmethacrylate, higher alkyl acrylates and other copolymerizable vinyl monomers. Preferred acrylic resin materials useful in the composites of the invention has a melt index of about 0.5 to 50, preferably about 1 to 30 gm/10 min. Polymer blends or polymer alloys can be useful in manufacturing the pellet or linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented. The primary requirement for the substantially thermoplastic engineering resin material is that it retain sufficient thermoplastic properties to permit melt blending with wood fiber, permit formation of linear extrudate pellets, and to permit the composition material or pellet to be extruded or injection molded in a thermoplastic process forming the rigid structural member. Engineering resin and resin alloys are available from a number of manufacturers including B. F. Goodrich, G.E., Dow, and Dupont.

Condensation Polymer Resins

Condensation polymer resins that can be used in the composite materials of the invention include polyamides, polyamide-imide polymers, polyarylsulfones, polycarbonate, polybutylene terephthalate, polybutylene naphthalate, polyetherimides, polyethersulfones, polyethylene terephthalate, thermoplastic polyimides, polyphenylene ether blends, pplyphenylene sulfide, polysulfones, thermoplastic polyurethanes and others. Preferred condensation engineering resins include polycarbonate materials, polyphenyleneoxide materials, and polyester materials including polyethylene terephthalate, polybutylene terephthalate, polyethylene naphthalate and polybutylene naphthalate materials.

Polycarbonate engineering resins are high performance, amorphous engineering thermoplastics having high impact strength, clarity, heat resistance and dimensional stability. Polycarbonates are generally classified as a polyester or carbonic acid with organic hydroxy compounds. The most common polycarbonates are based on phenol A as a hydroxy compound copolymerized with carbonic acid. Materials are often made by the reaction of a bisphenol A with phosgene ($COCl_2$). Polycarbonates can be made with phthalate monomers introduced into the polymerization extruder to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene resins, styrene maleic anhydride resins and others. Preferred alloys comprise a styrene copolymer and a polycarbonate. Preferred melt for the polycarbonate materials should be indices between 0.5 and 7, preferably between 1 and 5 gms/10 min.

A variety of polyester condensation polymer materials including polyethylene terephthalate. polybutylene terephthalate, polyethylene naphthalate, polybutylene naphthalate. etc. can be useful in the engineering resin wood fiber thermoplastic composites of the invention. Polyethylene terephthalate and polybutylene terephthalate are high performance condensation polymer materials. Such polymers often made by a copolymerization between a diol (ethylene glycol, 1,4-butane diol) with dimethyl terephthalate or 2,6 dicarboxy naphthalene. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher $T_g$ and higher stability at high temperature compared to the terephthalate materials. However, all these polyester materials are useful in the composite structural materials of the invention. Such materials have a preferred molecular weight characterized by melt flow properties. Useful polyester materials have a viscosity at 265° C. of about 500–2000 centipoise (cp), preferably about 800–1300 cp.

Polyphenylene oxide materials are engineering thermoplastics that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly(oxy-(2,6-dimethyl-1,4-phenylene)). Polyphenylene is often used as an alloy or blend with a polyarnide, typically nylon 6-6, alloys with polystyrene or high impact styrene and others. A preferred melt index for the polyphenylene oxide material useful in the invention typically ranges from about 1 to 20, preferably about 5 to 10 gm/10 min. The melt viscosity is about 1000 at 265° C.

Foaming

Foamed thermoplastics are typically made by dispersing or expanding a gaseous phase throughout a liquid polymer phase to create a foam comprising a polymer component and a included gas component in a closed or open structure. The preservation of the resultant foamed state is important to maintaining the desired structural properties. The most common process involves an expansion of foamed thermoplastic materials. The expansion process typically involves three steps. First, small discontinuities or cells are created in a fluid or plastic phase. These discontinuities are grown to desired volume to produce a cell structure. The cell structure is then stabilized by physical (cooling) or chemical (crosslinking) means to form the resultant foamed or cellularly polymer structure.

Virtually all thermoplastic foams are blown with inert gas foaming agents or decomposing chemical blowing agents. Such agents commonly foam using inert gases such as nitrogen or carbon dioxide, hydrocarbons containing 3 to 5 carbon atoms, chlorinated hydrocarbons and chlorofluorocarbons such as CFC-11, CFC-12, CFC-113, CFC-114. Chemical blowing agents operate by decomposition at elevated temperatures to an inert gas. Physical blowing agents operate by dissolving or dispersing in the plastic or melt polymer liquid phase and as pressure is released, flashing into the gaseous state creating the growth of the cellular structure. In the application of this invention, the preferred blowing agents are conventional diazo blowing agents which on decomposition yield nitrogen, an effective inert blowing agent that creates a cellular structure throughout the polymeric/wood fiber composite material. More specifically, blowing agents that can be used in the process of the invention include chemical blowing agents such as organic or inorganic bicarbonates or oxylates, azo-chemicals, hydrozides, and amine nitrates. Low boiling liquids which can produce gas by vaporization in lower pressure zones include carbon dioxide, aliphatic hydrocarbons such as propane, butane, pentane and isomers thereof. Chorinated and fluorinated hydrocarbons such as methylene chloride, dichloro-difluoromethane and monochlorotrifluoromethane are useful. The blowing agent is typically mixed with the thermoplastic materials in well known processes. Generally, chemical blowing agents are mixed with thermoplastic pellets or powders before introduction of the blended material into an extruder inlet. Physical blowing agents can be metered into the melt polymer in the extruder for intimate mixing prior to foaming in a lower pressure zone. Such blowing procedures are a well known process understood by one of ordinary skill in the art. Careful control of the blowing agent addition and extrusion temperature is necessary to insure that foaming occurs in the correct time and place and blowing agent is not wasted.

EXAMPLES

Foamed PVC-Wood Fiber Composite Formulation

All foam PVC wood fiber composite testing has been completed using material produced as follows:

- 75 pounds per hour feed rate of standard PVC wood fiber composite pellets (see U.S. Pat. Nos. 5,486,553, 5,539,027, 5,406,768, 5,497,594, 5,441,801 and 5,518,677 for pellet information)
- cofeeding of about 13.5 grams per minute of Reedy International AP40 (nitrogen ($N_2$) gas generating azide agent) blowing agent (1.786 lb/hr, 2.38%)
- cofeeding of about 36.1 grams per minute of Rohm & Haas Paraloid K-415 acrylic modifier (4.776 lbs/hr, 6.37%).

Extruder Operating Conditions

Materials used and representative extruder operating conditions for manufacturing the foamed PVC/wood fiber composite are shown in the following table.

| Substrate description, density | Standard PVC Wood fiber pellets 60% PVC, 40% Wood fiber- density = 0.6915 |
|---|---|
| Extruder Zone | Temperature in ° C. |
| Barrel Zone 1 | 175.0 |
| Barrel Zone 2 | 175.0 |
| Barrel Zone 3 | 185.0 |
| Barrel Zone 4 | 185.0 |
| Die Zone 1 | 185.0 |
| Die Zone 2 | 185.0 |
| Die Zone 3 | 185.0 |
| Screw Oil | 185.0 |
| Die Melt Temp | 199.0 |
| Motor Screw Pot | 250.0 |
| other conditions: | |
| Motor Screw RPM | 10.10 |
| AMPS | 60.00 |
| Head Pressure | 2840 psi |
| Vacuum at Vent Port | 10.00 psi |
| Feeding Method | SCHENCK |
| Feed Rate (lb/hr) | 75.00 |
| Puller Pot | 395.0 |
| Puller RPM | 6.600 |
| Production Speed (inches/min) | 48.50 |
| (grams/foot) | 156.0 |
| (Lbs/hr) | 83.00 |
| Vacuum Calibrator Block | 6.000 psi |
| Vacuum First Tank | 1.000 psi |
| Cooling Water Temperature (° F.) | 45.00 psi |
| Co-Extrusion Use | CAPPING layer |
| CoEx Zone 1 Temp | 180.0° C. |
| CoEx Zone 2 Temp | 180.0° C. |
| CoEx Zone 3 Temp | 180.0° C. |
| CoEx Zone 4 Temp | 180.0° C. |
| CoEx Adaptor Temp | 180.0° C. |
| Motor Screw RPM | 7.100 |
| Motor Screw AMPS | 8.600 |
| CoEx Head Pressure | 7940 psi |

| | Foamed Composite Rest Results: Experiment No Capping | | | |
|---|---|---|---|---|
| | Fine (50 mesh) | Standard | Planar Shavings | |
| Density (g/cc) | | | | |
| 60/40[1] | 0.87 | 0.82 | 0.84 | |
| 70/30 | na | 0.77 | na | **Standard pellet composite = 1.4 g/cc |
| 80/20 | 0.71 | 0.71 | 0.74 | Pine = 0.4 g/cc |
| COE ($\times 10^{-5}$ in/in° F.) | | | | |
| 60/40 | | 1.74 | | |
| 70/30 | | | | **PVC = $4.0 \times 10^{-5}$ in/in° F. |
| 80/20 | 2.57 | 2.81 | | Standard pellet composite = 1.2 |
| FLEX MODULUS (psi) | | | | |
| 60/40 | 333,115 | na | 293,775 | |
| 70/30 | na | 227,643 | na | **PVC = 410,000 psi |
| 80/20 | 147,663 | 132,611 | 170,608 | Standard pellet composite = 1,000,000 psi |
| Nail Insertion (pounds) | | | | |
| 60/40 | 129 | na | 149 | **No penetration into Standard pellet composite |
| 70/30 | na | 118 | na | before nail bends |
| 80/20 | 84 | 77 | 129 | Oak; slight penetration before bending |

[1]Wt./wt. ratio of PVC to Wood fiber.

Coefficient of Linear Thermal Expansion

Various polymers were tested for linear thermal expansion (ASTM No. D 696-91$\epsilon^1$). Each polymer was extruded as a mull casing for this test. The results of this testing are summarized in the table:

Summary Table

| Identification | Thermal Coefficient of Expansion (C.O.E.) |
|---|---|
| GEON ® 87020 (standard cellular PVC; no fiber) | $3.30 \times 10^{-5}$ |
| 70% PVC-30% wood fiber | $2.18 \times 10^{-5}$ |
| 80% PVC-20% wood fiber | $2.81 \times 10^{-5}$ |
| 60% PVC-40% wood fiber (50 mesh) | $1.83 \times 10^{-5}$ |
| 60% PVC-40% wood fiber (planar shavings) | $1.86 \times 10^{-5}$ |
| 80% PVC-20% wood fiber (50 mesh) | $2.57 \times 10^{-5}$ |
| 80% PVC-20% wood fiber (planar shavings) | $2.63 \times 10^{-5}$ |
| PVC (GEON ®) formulation | $3.15 \times 10^{-5}$ |
| PVC-wood fiber composite formulation (no foam) | $1.74 \times 10^{-5}$ |

The foamed wood fiber composite is more thermally stable than unfoamed PVC wood fiber composite and is more thermally stable than PVC. Both these materials have larger coefficients of thermal expansion than the foamed material. The advantage of a reduced coefficient of thermal expansion is a window that will fit in a window opening and weather more reliably.

Decking Bend Test

A decking bend test using a sixteen inch span was conducted to determine the lateral strength of various polymers by using an INSTRON force/displacement data set with three point testing. The tests were conducted on 16 inch long samples with cross sectional dimensions of 0.688× 2.078 inches. A standard force was applied to the mid-point and increased until a 0.25 inch displacement was obtained. This force and a calculated Young's Modulus was recorded for each test. The table below gives the load in pounds-force (lbs) and Young's Modulus for each sample material with a predetermined deflection of 0.25 inches. (ASTM Test No. D-1037- 96a)

| Sample Identification | Load at 0.25" deflection (lb-f) | Young's Modulus (psi) |
|---|---|---|
| Finger jointed/painted/edge glued/ veneer wrapped (wood) | 193.88 | 1,196,140 |
| Free foam PVC-Wood Fiber (no cap) | 35.33 | 213,768 |
| 0.060" PVC-Wood Fiber shell with cap | 53.84 | 325,631 |
| Free foam PVC with cap | 32.17 | 190,275 |
| Foam core | 58.44 | 350,268 |

While the foamed material does not have as much strength as wood or unfoamed composite, its properties are sufficient for use as decking and typical residential construction applications.

Retention Force Test

Retention force testing was conducted on foamed PVC-wood fiber composite using a Model 5500R INSTRON with a 1000 pound load cell and a crosshead speed of 0.200 inches per minute. Fasteners were inserted "narrow-wise", meaning insertion through the vinyl capstock, PVC-wood fiber composite and out through the capstock on the other side. A screw-gun operating at low RPM with a guiding sleeve was used to insert No. 8×2 inch galvanized deck screws, both with and without pilot holes. Nails were also tested, using 4D finish nails driven by hand with a hammer. In all tests, Ponderosa Pine was used as a control reference.

| Sample | Peak Load (lbs) | Standard Deviation (for load) | Peak Displacement (inches) | Standard Deviation (for displacement) | Energy to Break (in-lbs) | Standard Deviation (for breaking energy) |
|---|---|---|---|---|---|---|
| Deck screw, foamed PVC-wood fiber composite, no pilot | 517 | 42 | 0.094 | 0.029 | 72.2 | 7.9 |
| Deck screw, pine, no pilot | 554 | 40 | 0.072 | 0.013 | 52.7 | 8.9 |
| Deck screw, foamed PVC-wood fiber composite, pilot | 480 | 44 | 0.094 | 0.010 | 54.6 | 5.9 |
| Deck screw, pine, pilot | 512 | 34 | 0.080 | 0.008 | 48.6 | 3.3 |
| nail, foamed PVC-wood fiber composite | 85 | 1 | 0.024 | 0.010 | 2.8 | 1.7 |
| Nail, pine | 68 | 11 | 0.015 | 0.006 | 4.2 | 2.7 |

The properties of the foamed composite material in retaining a fastener such as a screw or nail is substantially the same (within test variation) as pine. The result is surprising in view of the foam nature of the composite and the solid nature of pine members.

Strip-out Test

Strip-out testing was conducted on foamed PVC-wood fiber composite using a screw-gun operating at low RPM with a guiding sleeve to insert No. 8×2 inch galvanized deck screws, both with and without pilot holes. A hand-held torque wrench was used to determine the strip-out torque. Each screw was driven through both a spacer block and the test block in order to ensure thread engagement throughout the sample.

| Sample | Average Strip-out Torque (in-lbs) | Standard Deviation |
|---|---|---|
| deck screw, PVC-wood fiber composite, no pilot | 28.1 | 2.1 |
| deck screw, pine, no pilot | 25.4 | 2.1 |
| deck screw, PVC-wood fiber composite, pilot | 26.5 | 2.1 |
| deck screw, pine, pilot | 25.2 | 0.4 |

Similar to the retention test, the strip-out shows that the foamed composite materials are equivalent to pine members in structural integrity when combined in a nailed or screwed structure.

Figures 1, 2, 3:
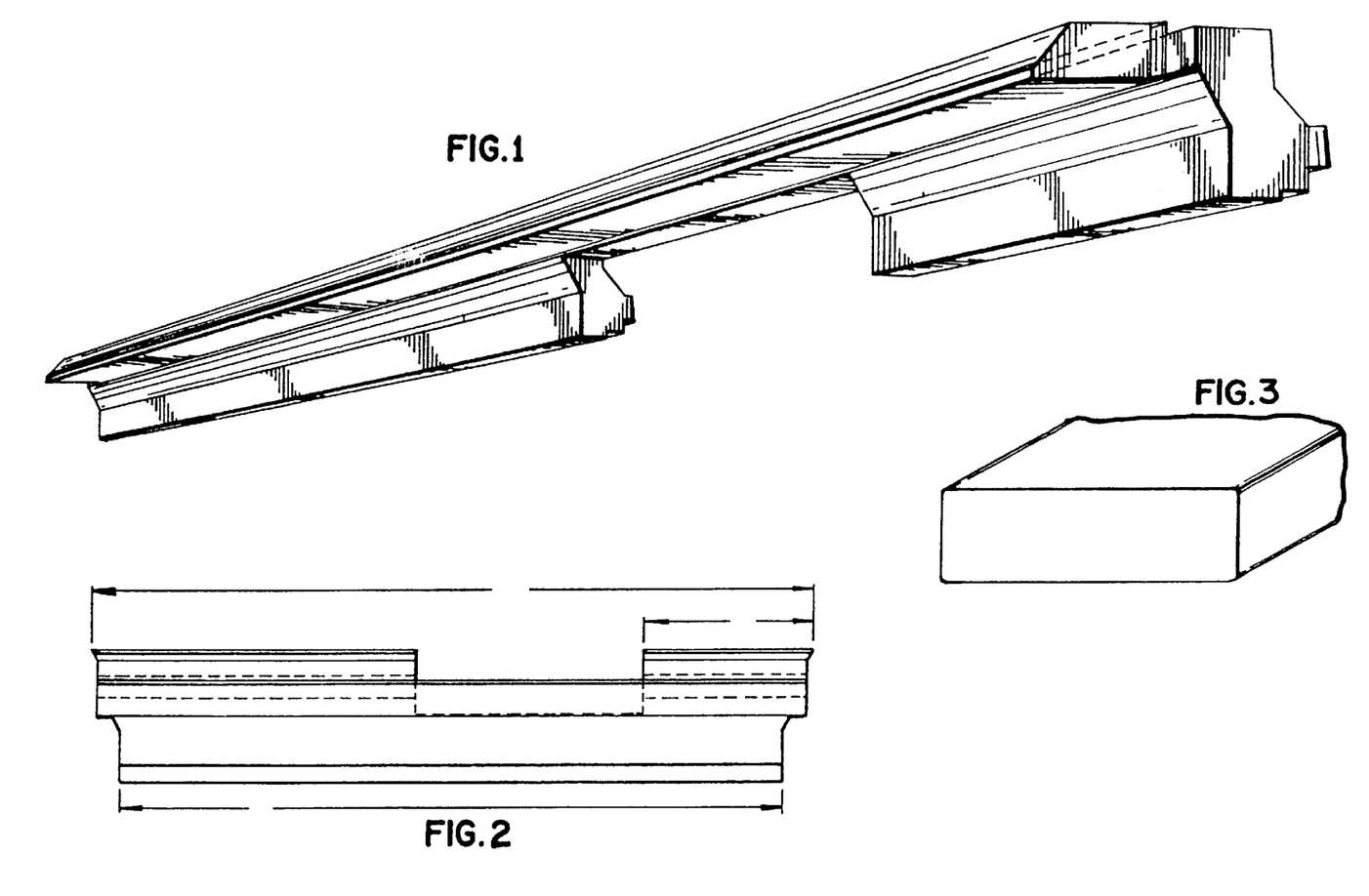
FIG. 1 is an elevated sideview of a typical sill stop used for the physical property testing discussed in the specification.
FIG. 2 is a direct sideview of a typical sill stop as used for the physical property testing discussed in the specification.
FIG. 3 is an isometric end view of a typical mull casing as used for the physical property testing discussed in the specification. These structures in FIGS. 1–3 are useful as components of fenestration units.

| | Shrinkage test 180° F. air oven | |
|---|---|---|
| Material | Percrent (%) Shrinkage | Comments |
| Gossen foam brick mold | 1.86 | commercially produced foam PVC profiles |
| Extrutech Plastics, Inc | 2.3 | commercially produced foam PVC profiles |
| foam PVC (GEON ® 87020) vent sill stop profile | 1.9 | |
| Foam PVC (GEON ® 87020) | 1.25 | |
| with capping (0.010") 2" mull casing profile (FIG. 3) | | |
| Foam PVC-wood fiber composite vent sill stop profile | 0 | not measureable |
| Foam PVC-wood fiber composite side stop profile | 0 | not measureable |
| Foam PVC-wood fiber composite 2" mull casing profile | n/a | profile distorted badly (bowed), measurement not taken |
| Foam PVC (GEON ® 87020) with capping (0.010") 2" mull casing profile (FIG. 3) | 1.25 | |

Notes:
ASTM D4726 PVC profiles used for windows and doors allow up to 2.2 percent maximum shrinkage - Test Method is ASTM D1042-60 min. heat @ 180° F. Air oven
Running average of Standard pellet composite profile extrusion is about 0.4 percent
Typical average for non-composite PVC extrusion about 2 percent The shrinkage values for the foamed PVC/wood fiber composite of the invention were very low. The shrinkage was smaller than measurable in a standard test specimen of a ten inch famed piece. Standard PVC (no fiber or foam) shrink about 1.8 to 2.2% under standard test conditions. Standard PVC/wood fiber composite shrinks about 0.4% under standard test conditions. In our testing, we found that the coefficient of thermal expansion for foamed composite materials was greater than for non-foamed composite. We expected the shrinkage for foamed composite to be greater than that for non-foamed composite. The substantial absence of shrinkage in the foamed composite was a surprise.

The above specification test data and examples provide a basis for understanding the means and bounds of the invention, however, the invention can have many embodiments which do not depart from the spirit and scope of the invention. The invention is embodied in the claims hereinafter appended.

What is claimed is:

1. A process for forming a foamed composite, the process comprising the steps of:
   (a) forming an extrusion mass comprising:
      (i) a vinyl polymer composition;
      (ii) wood fibers; and
      (iii) a foaming agent capable of foaming the polymer composition;
   (b) introducing the extrusion mass into an extruder path comprising a barrel, at least one screw drive, the path additionally comprising a moisture vent positioned between a first heated zone having a temperature of about 165 to 190° C. and a second heated zone having a temperature of about 165 to 190° C., the extrusion path leading to a mandrel and a shaping die comprising a calibration gauge;
   (c) heating the extrusion mass to at least 100° C. before reaching the moisture vent;
   (d) removing moisture but not the foaming agent from the extrusion mass as the extrusion mass passes the moisture vent;
   (e) forming a molten extrusion mass by heating the extrusion mass above its melting point;
   (f) exceeding the decomposition temperature of the foaming agent after the extrusion mass passes the moisture vent and melts but before the extrusion mass enters the die;
   (h) forming a foamed member from the extrusion mass in the die; and
   (i) contacting a surface of the solid foamed member in the gauge with a liquid, forming a member with at least a portion of its surface having a smooth hard character.

2. The process of claim 1, wherein the extrusion mass comprises a foaming agent and pellets comprising the thermoplastic polymer composition and wood fibers.

3. The process of claim 2, wherein the extrusion mass further comprises an acrylic modifier.

4. The process of claim 1, wherein the extrusion mass comprises pellets comprising the thermoplastic polymer composition, wood fibers, and the foaming agent.

5. The method of claim 4 wherein the decomposition temperature is greater than 150° C.

6. The method of claim 1 wherein the polymeric composition comprises a vinyl polymer comprising vinyl chloride.

7. The method of claim 1 wherein the extruder path comprises means, proximate the mandrel, to relieve gas pressure forming in the die.

8. The process of claim 1 wherein the extrusion mass comprises the agent and a thermoplastic pellet comprising the polymeric composition intimately blended with the fiber.

9. The process of claim 1 wherein the extrusion mass comprises an acrylic polymer agent to stabilize the foam, the foaming agent and a thermoplastic pellet comprising the polymeric composition intimately blended with the fiber.

10. The process of claim 1 wherein the member is a hollow member.

11. The process of claim 1 wherein the member is a solid member.

12. The process of claim 1 wherein the calibration gauge comprises a calibration block.

13. The process of claim 1 wherein the agent comprises a nitrogen generating blowing agent or a carbon dioxide generating blowing agent or mixtures thereof.

14. The process of claim 1 wherein the mandrel and die are maintained at a temperature of about 170 to 230° C.

15. The process of claim 1 wherein the liquid comprises water.

16. The process of claim 1, wherein the extrusion mass comprises wood fibers and pellets comprising the thermoplastic polymer composition and the foaming agent.

17. The process of claim 1, wherein the solid foamed member has a coefficient of thermal expansion less than about $3 \cdot 10^{-5}$ in/in-° F., a shrinkage of less than about 2% of an original dimension, and an average fastener retention of at least about 70% of a substantially similar pine member.

* * * * *